United States Patent [19]

Tschopp et al.

[11] Patent Number: 5,076,184
[45] Date of Patent: Dec. 31, 1991

[54] METHOD OF CONTROLLING A SEWING MACHINE AND A SEWING MACHINE UTILIZING THIS METHOD

[75] Inventors: Gérard Tschopp, Geneva; Claude Buchilly, Vevey; Christian R. Kohli, Thonex, all of Switzerland

[73] Assignee: Mefina S.A., Switzerland

[21] Appl. No.: 550,833

[22] Filed: Jul. 11, 1990

[30] Foreign Application Priority Data

Jul. 11, 1989 [CH] Switzerland ................. 2582/89

[51] Int. Cl.$^5$ ............................................. D05B 3/02
[52] U.S. Cl. ................................... 112/266.1; 112/456; 112/458
[58] Field of Search ............... 112/458, 456, 453, 454, 112/457, 121.12, 103, 266.1, 262.3

[56] References Cited

U.S. PATENT DOCUMENTS

| Re. 32,143 | 5/1986 | Carbonato et al. | 112/454 |
| 4,138,944 | 2/1979 | Garron | 112/458 |
| 4,368,682 | 1/1983 | Takenoya | 112/458 |
| 4,557,207 | 12/1985 | Turner et al. | 112/266.1 |
| 4,599,959 | 7/1986 | Sano et al. | 112/456 X |
| 4,821,662 | 4/1989 | Pongrass et al. | 112/266.1 |
| 4,945,842 | 8/1990 | Nomoto et al. | 112/121.12 X |

Primary Examiner—Peter Nerbun
Attorney, Agent, or Firm—Cushman, Darby & Cushman

[57] ABSTRACT

A method for controlling a computerized sewing machine which enables designs or patterns of modified length with respect to the standard value of each original design or pattern available to be sewn while retaining the density of stitches and the general shape of the original design. Algorithms are utilized indicating, for each block of stitches included in the original design or pattern, the number of times that this block is to be sewn to obtain the design of modified length. The microprocessor sewing machine using the method of the invention includes means requiring the microprocessor to read ongoing instructions repeatedly for at least certain blocks among the block of stitches for the basic design or pattern.

5 Claims, 6 Drawing Sheets

FIG. 5
FIG. 5A
FIG. 5B
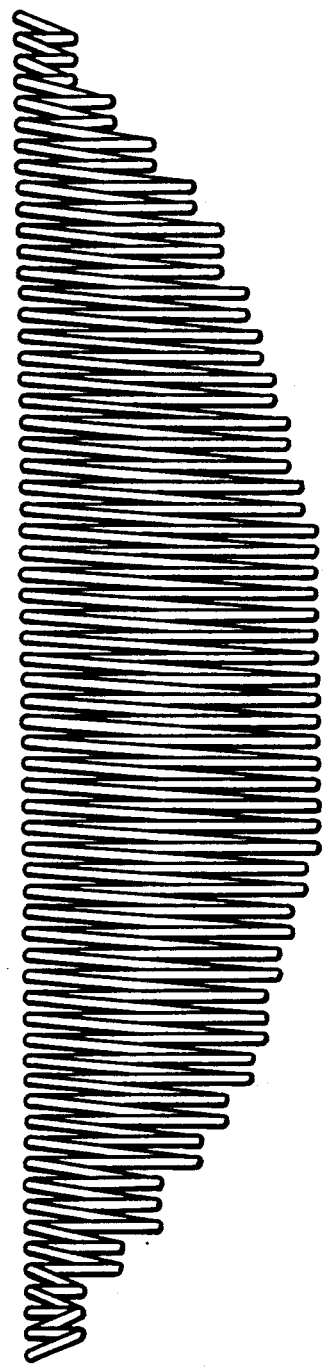
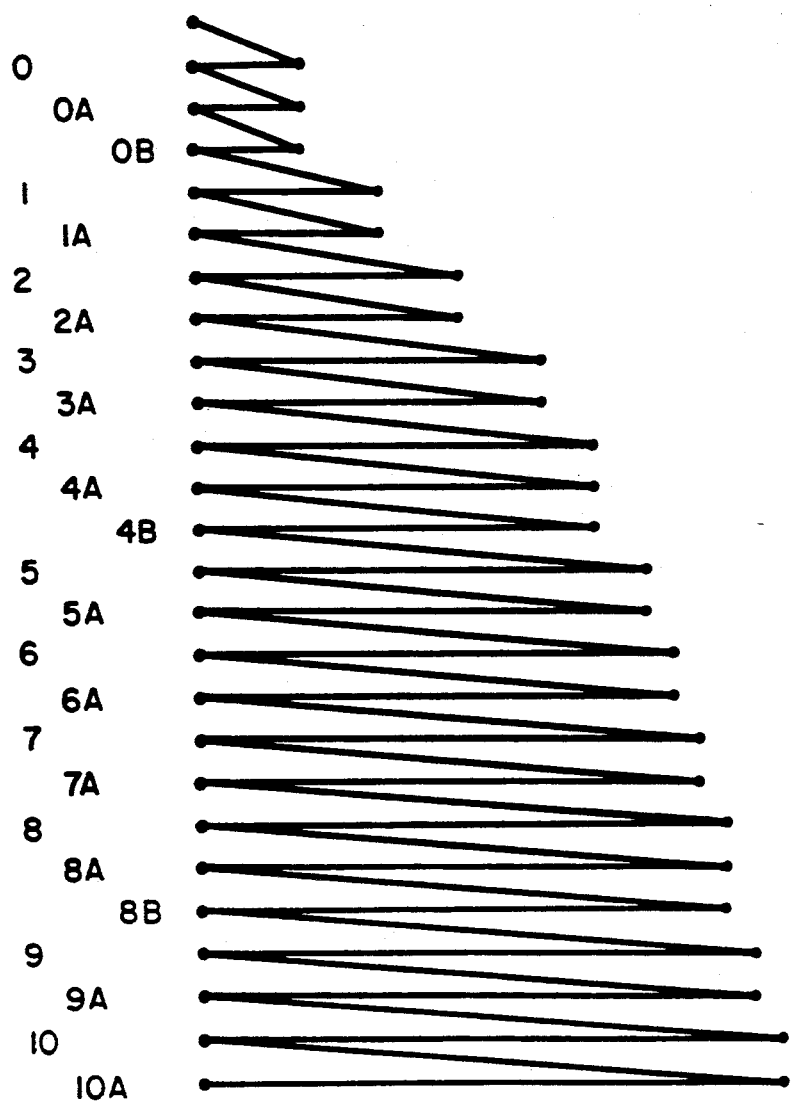

METHOD OF CONTROLLING A SEWING MACHINE AND A SEWING MACHINE UTILIZING THIS METHOD

BACKGROUND OF THE INVENTION

Field of the Invention

The present invention relates to a method of controlling a sewing machine, in particular a sewing machine comprising an axially movable needle, a device for driving the needle with an alternating axial movement, a mechanism for controlling the relative displacement, in translation, of the needle and the material to be sewn, a loop pick-up and its control device, and means for controlling in synchronism said mechanisms and the device, adapted in such a manner as to sew on the material designs or patterns each formed by a plurality of blocks of stitches and at least a portion of the shape of each of which embodies at least one series of two adjacent stitches resulting from a relative displacement of the cloth and the needle, of different amplitude and/or orientation from stitch to stitch. The machine further comprises a control unit for the control means and the device enabling respective increase or reduction in the base length of a design or pattern while keeping the density of the stitches sewn constant.

The invention also relates to a computerized sewing machine, comprising
- first means for controlling alternating axial movement of a needle to penetrate into the material to be sewn, and a loop pick-up adapted to co-operate with the needle to form a sewing stitch,
- second means for controlling the relative displacements of the needle and the material to be sewn in two orthogonal directions of specific amplitude in each direction,
- at least one electronic memory for storage of sewing instructions corresponding to various designs or patterns to be sewn, these instructions being capable of being selectively and sequentially read to effect control of said second means,
- first units for selection of said designs or patterns,
- a microprocessor co-operating with said memory to read from it sewing instructions for any design selected and to control as a result the second control means,
- third means operating on the microprocessor, based on instructions stored in the memory, to control the formation of designs or patterns of different length from those corresponding to said instructions.
- second units for selection of the variation in length desired in the formation of any preselected design or pattern.

BRIEF SUMMARY OF THE INVENTION

According to the invention, there is provided a method for controlling a sewing machine, in particular a sewing machine comprising an axially movable needle, a device for driving the needle in an alternating axial movement, a mechanism for controlling relative displacement, in translation, of the needle and of the material to be sewn, a loop pick-up and drive means for it, and means for controlling in synchronism said device, mechanisms and means, adapted in such a manner as to sew onto the material designs each formed by a plurality of blocks of stitches and at least a portion of the shape of which embodies at least a series of two adjacent stitches resulting from a relative displacement of the cloth and the needle, of different amplitude and/or orientation from stitch to stitch, the machine comprising a control unit for said means and said device enabling respectively increasing and decreasing the basic length of a design while keeping the density of the stitches sewn constant, a method according to which, to increase the length of the design, the sewing of at least certain blocks of stitches of the basic design is repeated at least once, immediately after the block to be repeated, while to reduce the length of the basic design, the sewing of at least certain of the blocks of the basic design is suppressed, the total number of blocks of the design thus modified being equal to the number of blocks of the basic design multiplied by the ratio of the length desired for the modified design to the length of the basic design.

Preferably each increase or decrease respectively in the basic length of the design chosen is a multiple of a unit increment of predetermined value, and each block of stitches of the basic design is repeated a number of times R-1. where $R = \text{interger} (K/N + 1)$    [1]   if $B_N K_N$ $R = \text{interger} (k/N)$    [2]   if $B_N K_N$ equations in which
- N is an integer 1, of value corresponding to the inverse of the unit increment I;
- B=0, 1, 2 ... N−1 is a number characteristic of the position occupied by each block of stitches of a basic design of "n" blocks, between the beginning (position o) and the end (position n−1) of this design;
- $B_N$ is the absolute value of B calculated in a numeric system of base N;
- K is the ratio between the total length of the design and the value of the unit increment; and
- $K_N$ is the absolute value of K calculated in a numeric system of base N.

In another aspect the invention provides a computerized sewing machine, comprising:
- first means for controlling, on the one hand, alternating axial movement of a needle with a view to making it penetrate into material to be sewn, and on the other hand, a loop pick-up adapted to co-operate with the needle with a view to effecting formation of a sewing stitch.
- second means for controlling relative displacements of the needle and the material to be sewn in two orthogonal directions with a specific amplitude in each direction,
- at least one electronic memory for storing sewing instructions corresponding to various designs to be sewn, these instructions being capable of being read sequentially and selectively to effect control of said second means,
- first selection units for said designs,
- a microprocessor for co-operating with said memory to read from it sewing instructions for any selected design and to control as a consequence the second control means,
- third means for operating on the microprocessor, based on instructions stored in the memory, to control execution of designs of a length different from that corresponding to said instructions, and second units for selection of the variation desired in the length to be implemented for any preselected design, wherein said third means embodies, stored in the memory, on the one hand, a first sequence of computerized instructions causing the microprocessor to read repeatedly instructions for sewing at least certain from among the blocks of stitches comprised in the selected design as memorised in such a manner as to obtain a corresponding repetition of the sewing of these blocks within the design of modified length as a function of the variation selected by actuation of said second units, and, on the other hand, at least a second sequence of computerized instructions setting the number of times that each block belonging to the original design should be sewn, in the modified design, as well as the positioning of the block within the modified design, the procedure being effected in such a manner that the elongated design sewn on said material has the modified length required while retaining a general shape resembling that of the basic design stored in the memory and from which it is derived.

Said second sequence of computerized instructions suitably embodies algorithms giving the number R of implementations, in the elongated design, of each block of stitches of the basic design as a function of the position of the block within this basic design as well as of the length desired for the elongated design.

Said third means may additionally embody a first counter for the blocks of the basic design, a second counter adapted to record, for each block of the basic design, the number of times R that it should be implemented, an element for bringing the microprocessor to the part of the program corresponding to the beginning of the sewing instructions for the block which is to be read as long as the number R indicated by the second counter is greater than 0, an element for directing the microprocessor to read the sewing instructions for this block of stitches, an element for decrementing the second counter by one unit as a result of this reading, and an element for incrementing by one unit the block counter while the value memorised in the second counter is nil, this counter thus memorising, at each instant, the position of the block of the basic design for which it was necessary to calculate the number of implementations R within the elongated design.

BRIEF DESCRIPTION OF THE DRAWINGS

The accompanying drawings illustrate, by way of example, the method according to the invention as well as a sewing machine for its implementation:

FIGS. 3, 4 and 5 represent, in actual size, a sewing design as it appears on a material to be sewn, for example on a piece of cloth, respectively in its original shape and dimensions, elongated by 75% and elongated by 125%;

FIGS. 3A, 4A, 5A show designs corresponding to the designs of FIGS. 3 to 5, but represented with an enlargement of five times;

FIGS. 3B, 4B and 5B are partial and schematic views of the same designs as form the subject of FIGS. 3 to 5, but illustrated with an enlargement of fifteen times;

DETAILED DESCRIPTION OF THE DRAWINGS

Figure 1:
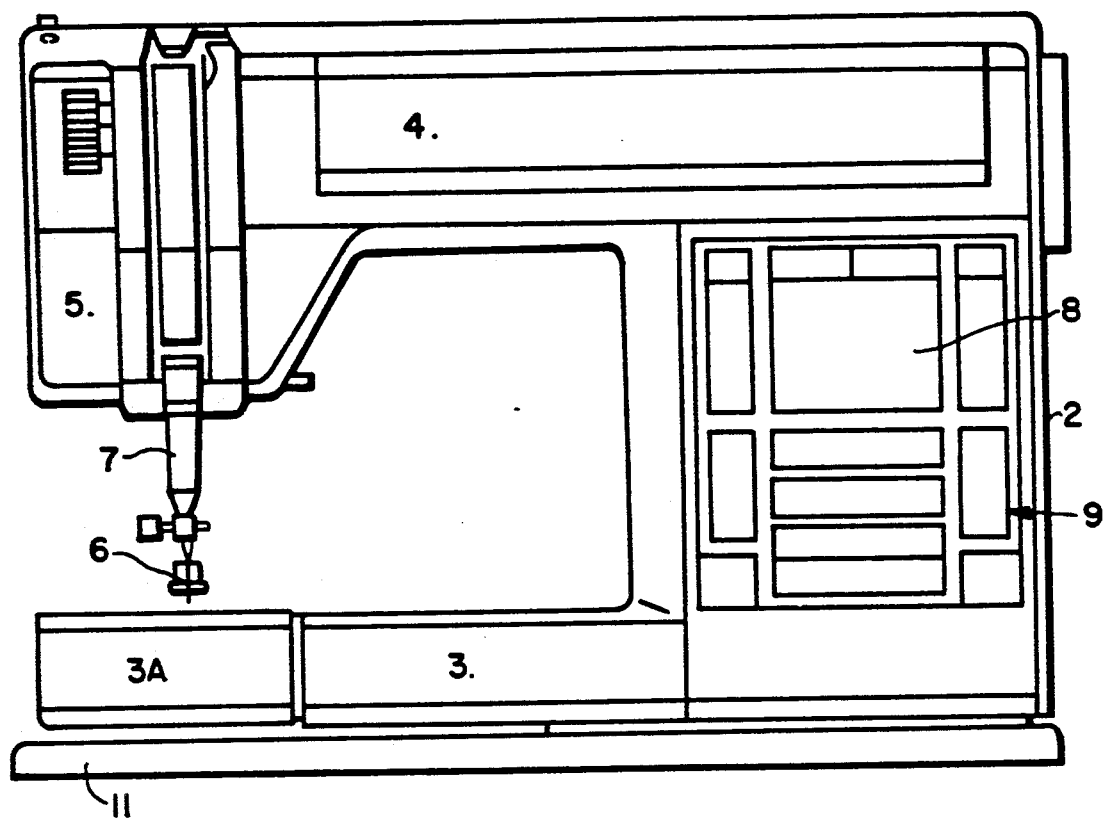
FIG. 1 is a view in elevation of the front of the machine.

The machine represented in FIG. 1 comprises, in traditional manner, a base 1 on which stands a column 2 carrying a free arm 3 and an upper arm 4 at the end of which is disposed a sewing head 5.

A mechanism $M_1$ (FIG. 6) is located in the free arm, for control of a loop pick-up and a device for driving in translation the material to be sewn, both diagrammatically represented by the rectangle 39.

In known manner, the loop pick-up is called upon to co-operate in synchronism with a movable needle 6 fixed at the end of a needle bar 7 driven in a vertical and transversal movement (throwing, casting or stitching movement) by a control mechanism $M_2$ (FIG. 6) disposed in the head 5 and in the arm 4.

Figure 2:
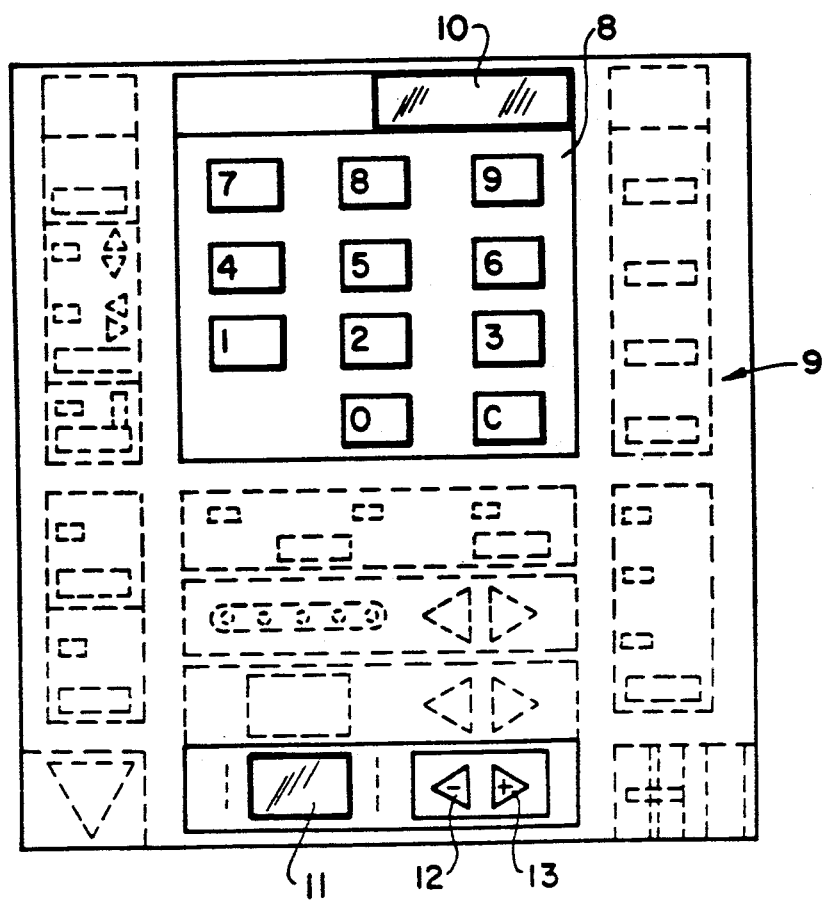
FIG. 2 shows a detail of the casing of this machine to a larger scale.

The sewing machine represented is a microprocessor MP controlled machine (FIG. 6), that is to say, a machine in which the different data for the designs to be sewn is stored in an electronic memory P, ROM or PROM for example, and may be called upon, for the formation by the machine of a corresponding design, by manual programming using a numeric keyboard 8 comprising ten keys 0 to 9 (FIGS. 1 and 2) as well as a clear key C, the whole being part of a control panel 9 disposed on the front face of the column 2 of the machine.

Such a panel usually comprises a plurality of other control and display keys adapted to allow actuation and/or viewing of characteristics specific to each function and/or their correct sequencing. In the case in question, the displays and the keys relating to the present invention have been depicted in full line on the drawing, the other elements being outlined in broken line.

Thus 10 represents a display device, for example of the LCD or light-emitting diode type, adapted to indicate the number programmed by actuation of the keys 0 to 9 of the keyboard 8. This device may display one, two, even three digits, depending on the nature of the entry code for each design to be sewn.

At the bottom of the control panel 9, there is disposed a second display device 11, which may also be of the LCD or light-emitting diode type, and, to the right of this, two triangular keys 12 and 13.

The microprocessor MP such as schematically depicted embodies two counters $C_R$ and $C_B$ as well as a timing unit D: the use of these three means will be made clear in the following text.

Figure 6:
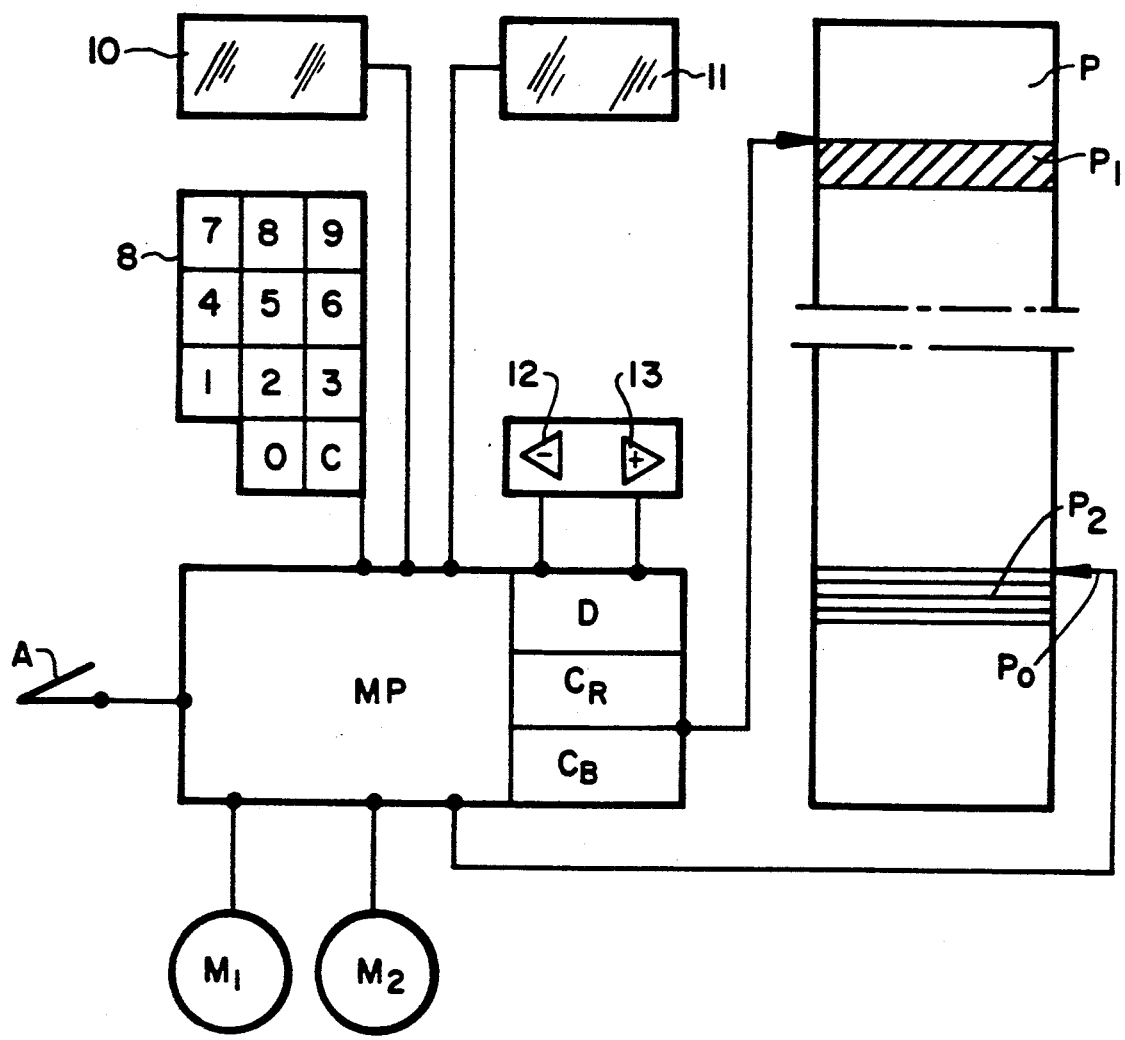
FIG. 6 shows a portion of the computerized control schematic for the sewing machine according to the invention.

An actuator A allows control of the switching on and off of the sewing machine described (FIG. 6).

The keys 12 and 13 enable control for example by actuation of key 13 only, of an increase in length of the various designs capable of being selected by the keyboard 8, and sewn by the machine, or alternatively a decrease in this length by actuation of the key 12. In either case, the size of such variations is the subject of a corresponding quantitative indication appearing on the display device 11. This indication will appear, for example, in the form of the number 1.25, if the design is elongated by 25%, or of the number 0.75 if it is shortened by this same amount.

This type of function and the means which enable it to be effected, in particular in microprocessor sewing machines, being well known to the man skilled in the art, will not be expanded on any further.

It should however be noted that when it is desired to elongate a design, such an elongation is obtained by simply increasing the length of the transport step (that is to say the incremental advance of the material to be sewn which takes place progressively with the sewing) in proportion to the desired elongation. The machine proceeds in inverse manner when the design is to be shortened.

It thus follows that the density of stitches sewn per surface unit of the material which carries them decreases in inverse proportion to the elongation desired, while it increases according to the same law as a function of the shortening of the design, when this latter possibility has been chosen.

Designs based on "bourdon" stitches being in particular in question, it will be understood that the general appearance of such designs elongated or shortened in the manner mentioned may become quite altered with respect to that of the original design.

This difference in appearance is due for the most part to the fact that if a given design is elongated in the manner indicated above, given that the number of stitches sewn will remain constant, the new design obtained will have gaps appearing between the different sections sewn, gaps which will obviously be of greater magnitude as the elongation of the designs increases.

Vice-versa, in the case of shortening a design, the density of the thread may become too great, in particular if the magnitude of such a shortening is great. The appearance of the resulting design will thus deteriorate very much on the surface, the threads of the various stitches becoming susceptible to overlapping and to being superimposed in an unpredictable and irregular manner.

The invention aims precisely to overcome both of the above disadvantages.

Accordingly, it proposes to add to the various known functions of modern sewing machines, including that of elongation or shortening of the length of a design, obtained by simple variation in the length of the unit transport step for the material to be sewn, a function known as "elongation" by virtue of which it will be possible, from a basic design of standard length, to obtain another design of similar general shape to the original shape of the basic design, in an almost perfect homothetic relationship, and in which the stitch density per unit length of the elongated design will remain identical to the density of the corresponding basic design, and this because the transport step will stay the same for the basic design and for the elongated design.

In the description which follows the elongation will be termed "positive", if the resulting elongated design has an overall length greater than the length of the basic design; it will be termed "negative". if the length of the elongated design is less than that of the basic design.

In practice, for the sewing machine according to the invention, the elongation function will be brought into operation by simultaneous actuation of the two keys 12 and 13, the same keys which individually allow respective control of the "shortening" and "elongation" functions for a design.

As will be seen in the following text, simultaneous actuation of the keys 12 and 13 being physically impossible to perform, the "elongation" function may be obtained as soon as these keys have been successively actuated within a time lapse of the order of 1 to 2 seconds, a time lapse fixed by the previously mentioned timing unit D.

It should also be noted that the description and the drawings to which it refers deal specifically with elongation of designs based on the "bourdon" stitch, that is to say on designs formed by a succession of "blocks" of stitches obtained in known manner by the following series of operations transport of the material to be sewn for one step length, casting or stitching movement of the sewing needle and sewing or penetration of the material.

further transport of the material to be sewn, further casting or stitching and sewing or penetrating.

It goes without saying that all the explanations which will be given remain valid for the sewing of designs formed by means of blocks of stitches obtained by one single transport movement followed by a single stitching movement. This will also be true for any design for which the blocks of stitches will have been obtained by repetition of more than two pairs of "transports" and of "stitchings".

In a very general manner, the process which will be described may also be utilized for sewing machines in which the needle does not carry out any casting movement, the material to be sewn being itself successively driven n two orthogonal directions by a support frame.

Thus whatever the structure of the sewing machine used, it may be stated that a block of stitches will be the result of executing a set of data which represents, between two successive pricks of the needle, a relative displacement, in two orthogonal directions, of this needle and the material to be sewn.

After selection of a basic design, such as that illustrated in FIG. 3, by actuation of the keys of the keyboard 8 (introduction of a one, two or three digit code corresponding to the design selected) and actuation of the keys 12 and 13 within the time lapse mentioned, the microprocessor MP of the sewing machine will control and carry out an operating procedure which will now be described with reference to FIGS. 6 and 7 in particular.

It should first of all be noted that according to the invention, the manner in which this process proceeds is directly related to the conditions in which the desired elongation is to be obtained, which are either imposed "a priori" by the machine itself, that is to say by certain operational parameters set at the factory, or imposed by the user.

The parameters imposed by the machine are in fact:

a) the number of stitches comprised in each basic design, b) the value in % of the increment I of elongation obtained by a single actuation of key 12 or key 13 after the "elongation" function has been brought into operation in the manner described.

The parameter imposed by the user will essentially be that ensuing from the type of key 12 or key 13 actuated to obtain the negative or positive kind of elongation desired and from the number of such actuations, which will set the length of the elongated design and, as a result, the number of blocks which must be sewn.

As previously indicated, this number will be greater than the number of blocks of the basic design, if the elongated design is to have a greater length than that of the basic design. It will however be less in the opposite case.

The number of blocks of an elongated design will be proportional to the number of blocks comprised in the basic design from which it is derived in direct proportion to the overall lengths of these two designs: accordingly, the stitch density will remain the same in the elongated design as it was in the basic design.

Furthermore, in order to obtain an elongated design whose appearance will remain similar to that of a corresponding basic design, the invention proposes, when the desired elongation is "positive", to provide that, during the sewing of the elongated design, the sewing machine proceeds by repeating the sewing of certain blocks of the original design a certain number of times, and this up to a limit of the total number of blocks necessary to obtain the elongation desired.

The blocks "repeated" will be sewn immediately after the "original" block.

If the elongation is to be negative, the sewing of certain blocks from among the blocks of the basic design will be suppressed, the total number of blocks thus suppressed being dependent on said elongation.

Furthermore, it is evident that to obtain elongated designs conserving, in so far as possible, an appearance resembling that of the corresponding basic designs, it would be best to effect an appropriate choice of the blocks of stitches to be repeated or suppressed depending on the nature of the elementary shape to which they correspond once sewn on the material to be sewn and for each given basic design, depending on the position which they occupy within this design.

According to the invention, the procedure which has just been outlined may advantageously be implemented by the making use of the following system of algorithms.

The applicant has, in fact, found that for a given value "I" of the increment of elongation, the shape of the resulting elongated design will remain most similar and regular, compared to the shape of the original design, if each block of stitches of the basic design is sewn, in the elongated design, a number of times R such that $$R = \text{integer } (K/N + 1) \quad [\text{I}], \quad \text{if } |B|_N < |K|_N$$
or
$$R = \text{integer } (K/N) \quad [\text{II}], \quad \text{if } |B|_N \geq |K|_N$$

In these equations,

N is a whole number greater than 1, corresponding to the inverse of the value of the increment I chosen: by way of example, if I=25%. N will be equal to 4.

B=0, 1, 2, ...n−1, is a number characteristic of the position occupied by each block of stitches of a basic design comprising "n" blocks, from the beginning (position 0) to the end (position n −1) of this design;

$|B|_N$ is the absolute value of B calculated in a numeric system of base N.

It should be noted that the number of times R that a block of stitches existing in the basic design is to be found in the elongated design, may be nil, which signifies that this block will not be sewn in the elongated design., this will be the case for a design subjected to a "negative" elongation, the length of which is however less than the length of the corresponding basic design.

According to the invention, by utilisation of the algorithms and conventions quoted above, the microprocessor MP of the machine will determine, for each block of stitches comprised in a specific standard decorative design which is to be the subject of a positive elongation, which block should be repeated after the original block, and how many times, in order to obtain the design elongated by the chosen number of increments.

In the same way, in the case of a negative elongation, the microprocessor is able to establish those blocks from among the blocks of stitches of the basic design which are to be suppressed so as to obtain the design elongated by the amount desired, while retaining an appearance which resembles, as far as possible, that of the original shape.

Figure 3:
Figure 4:

This procedure will now be illustrated with reference in particular to FIGS. 3 to 5 showing, respectively, in FIG. 3, a decorative design of standard length shown to a scale of 1:1, in FIGS. 4 and 5, the same design, positively elongated by 75% and by 125% respectively with respect to its original length, by utilizing the method according to the invention.

Figure 3A:
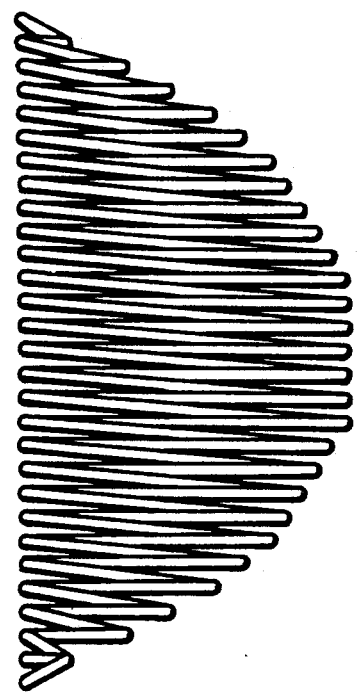
Figure 3B:
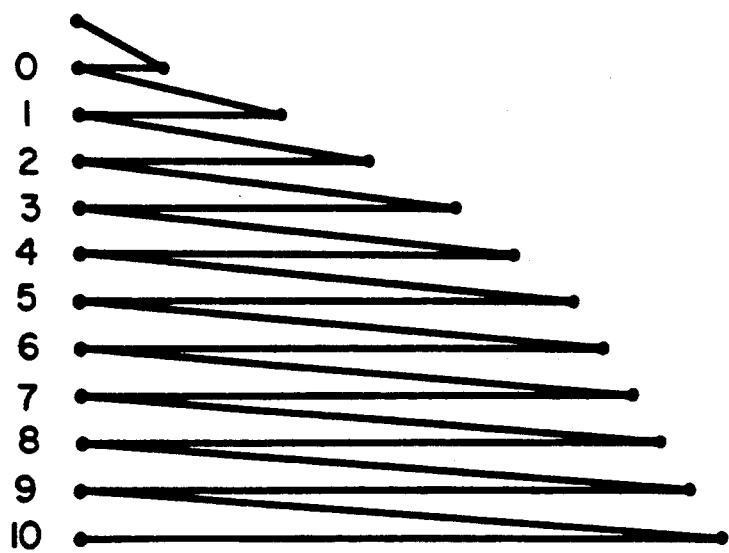

As may be seen more particularly in FIG. 3B, the design depicted in FIG. 3 is obtained by sewing "bourdon" type stitches and is composed of juxtapositioned blocks, numbered 0 to 10 for a better understanding of the explanations which follow.

Figure 4A:
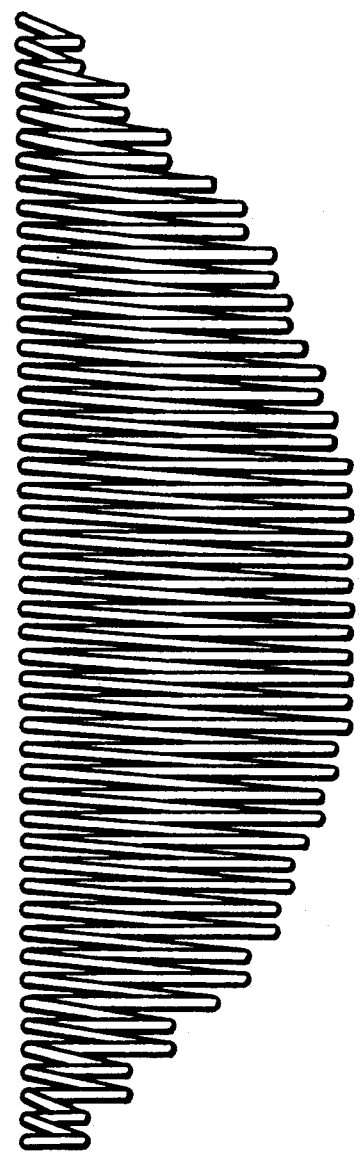
Figure 4B:
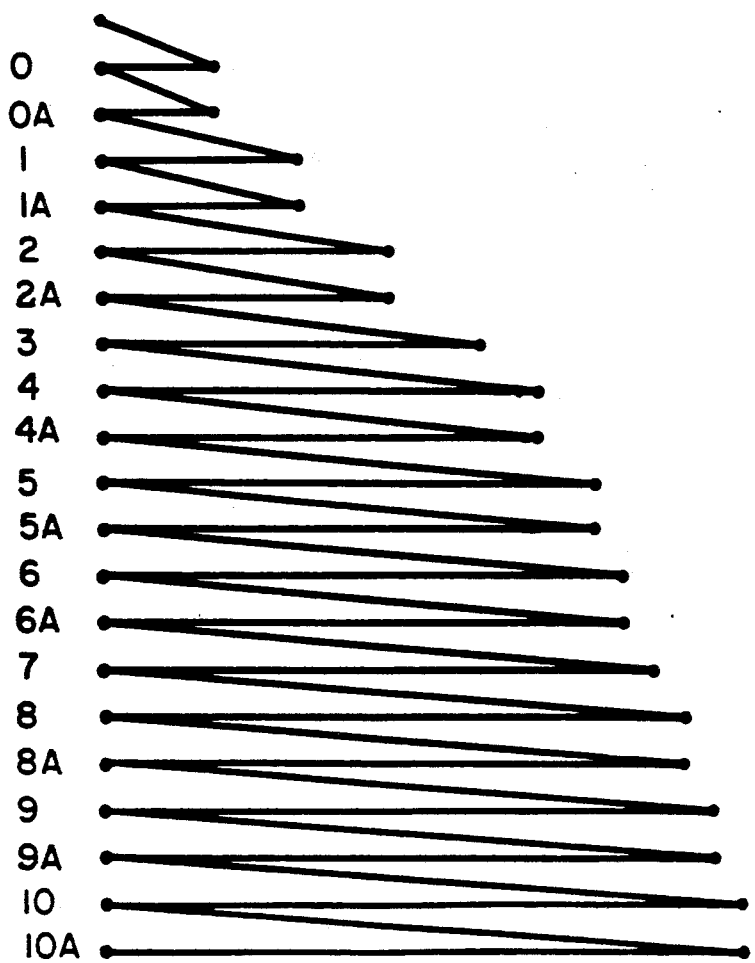

FIGS. 4B and 5B show in detail the evolution of the appearance taken on by the design of FIG. 3 when it is positively elongated using the method according to the invention.

It may be seen, in particular in FIG. 4B, that the elongation of 75% was obtained by repeating the sewing of the following blocks:

0; 1; 2; 4; 5; 6; 8; 9; 10,

The repeated blocks are designated by the same number as the original block reproduced, with the letter A added, for example 0A.

However, the blocks 3; 7 were only sewn once.

It should also be noted that each supplementary block was repeated immediately after the original block to which it corresponds.

In the case of FIG. 5B, corresponding to the design elongated by 125%, it may be seen that this elongation was obtained by repeating certain blocks of stitches twice and three times for other blocks.

Thus the following blocks were repeated twice

1; 2; 3; 5; 6; 7; 9; 10, while blocks 0, 4 and 8 were each repeated three times. The second block repeated in these two cases is designated in the drawing by the numbers 0B, 4B and 8B respectively.

In the case depicted, the increment I chosen being 25%, the value of the factor K is 7 for the design elongated by 75% (FIGS. 4, A and 4B) and 9 for the design elongated by 125% (FIGS. 5, 5A and B).

The case of the design elongated by 75% may first of all be examined:

N being equal to 4, the value of the factor $|K|_4$ is to be calculated in a numeric system of base 4 such that $$K = 1\ 2\ 3\ 4\ 5\ 6\ 7\ 8$$
$$|K|_4 = 1\ 2\ 3\ 0\ 1\ 2\ 3\ 0$$

For K=7, it may be seen that $|K|_4$ will be equal to 3.

In the same system to the base 4, the number B, characteristic of the position occupied by each block within the basic design, will become, for the first ten blocks of the design, $$B = 0\ 1\ 2\ 3\ 4\ 5\ 6\ 7\ 8\ 9$$
$$|B|_4 = 0\ 1\ 2\ 3\ 0\ 1\ 2\ 3\ 0\ 1$$

As long as $|B|_4$ remains less than $|K|_4$, the number of times the sewing of a same block will take place must be calculated by the equation "I" mentioned previously; it will be given by the equation "II" in the opposite case.

Since, in the example depicted, $|K|_4=3$ and K/N=7/4=1.75, the blocks

0; 1; 2; 4; 5; 6; 8; 9; etc will be sewn a number of times R such that

R=integer (1+K/N)=integer (1+1.75)=2

The remaining blocks 3 and 7, will have to be sewn once, R being equal to the integer K/N=1.75, that is 1.

FIGS. 4A and 4B show precisely the appearance of the elongated design which would be obtained if the sewing machine were to carry out the design based on the above data.

In the case of a design elongated by 125%, K will be equal to 9, that is to say $|K|_4=1$ and K/N=9/4=2.25.

The blocks 0, 4 and 8, such that $|B|_4 < |K|_4$, must each be sewn a number of times equal to R=integer (1+K/N)=integer (1+2.25)=3.

The blocks 1; 2; 3; 5; 6; 7; 9; 10; such that $|B|_4 < |K|_4$ must each be sewn a number of times equal to the integer of K/N=2.25, that is twice.

FIGS. 5A and 5B show how the elongated design appears when it is obtained with a sewing machine working in this manner.

That which has been said concerning positive elongation of a basic design is obviously also applicable, mutatis mutandis, in the case of negative elongation.

Thus in the case of a negative elongation of 25%, and making use of the same algorithms I and II and the foregoing notations, K will be $3|K|_4=3$ and K/N=0.75; the blocks 0, 1; 2; 4; 5; 6; 8; 9; 10, such that $|B|_4 < |K|_4$ will be sewn a number of times equal to R=integer (K/N+1)=integer (0.75+1)=1.75, that is, once.

The blocks 3; 6; 9, such that $|B|_4=|K|_4=3$ must each be sewn a number of times equal to the integer of K/N=0.75, that is 0 times. This signifies that the blocks 3; 6; 9; etc. of the basic design will be suppressed in the negatively elongated design.

In practice, the set of instructions which must be followed by the microprocessor MP to enable the machine to form an elongated design is stored in a portion P₁ of the memory P (FIG. 6) in which, in particular, the instructions are also placed which are necessary for control of the mechanisms M₁ and M₂ on which formation of the stitches of the designs capable of being selected from the keyboard and from the machine depend.

In the drawing, P₂ depicts schematically the region of the memory P occupied by the first block (block "0") of a basic design preselected with a view to its being implemented in elongated form. It being a question of a design based on the "bourdon" stitch, the region P₂ will comprise four bytes of instructions, that is a first byte specifying the transport of the support to be sewn, for example a piece of cloth, over one step length, a second byte setting the amplitude of the casting or stitching movement to be carried out by the needle-bar 7 (FIG. 1), a third byte controlling the displacement of the cloth through a further step, finally a fourth byte on which a further casting or stitching movement of the needle-bar 7 depends.

If the basic design selected comprises blocks of stitches, there will be, in the memory P, n regions similar to the region P₂ which must be scanned successively by the pointer p₀ associated with the microprocessor MP from the start of the design (block of stitches B₀) to the end (block B_{n-1}). for the machine to be able to carry out sewing of the entire design.

As is known, uninterrupted actuation of actuator A has the effect that each time the microprocessor MP has finished reading the instructions for the last block of stitches for a selected design, it recommences reading the section of memory relating to this design so that the machine will sew for a second time, the design already sewn, and so on.

Let us now look at what happens when the user having selected a basic design using the keyboard 8 wishes the machine to sew this design in elongation.

According to the invention, the elongation function of the machine is only implemented if the microprocessor receives an actuating signal from the two keys 12 and 13 within a maximum given time delay, for example of the order of 2 seconds, set by the timing unit D (FIG. 6).

If only one of the keys 12 and 13 has been pressed during this time delay, any successive operation of the actuator A will result in simple sewing of the preselected design in elongation or in shortened form.

In similar manner, successive actuation of the two keys 12 and 13 within a time delay greater than the time limit set by the timer D will result in sewing of the selected design in its original dimensions, the length dimension set by actuation of key 12 being compensated for by a corresponding increase obtained by pressing key 13.

On the contrary, if, as described, the user has pressed the two keys 12 and 13 within the prescribed time delay, the microprocessor begins the process of elongation following the instructions of the section of the program P₁.

Figure 7:
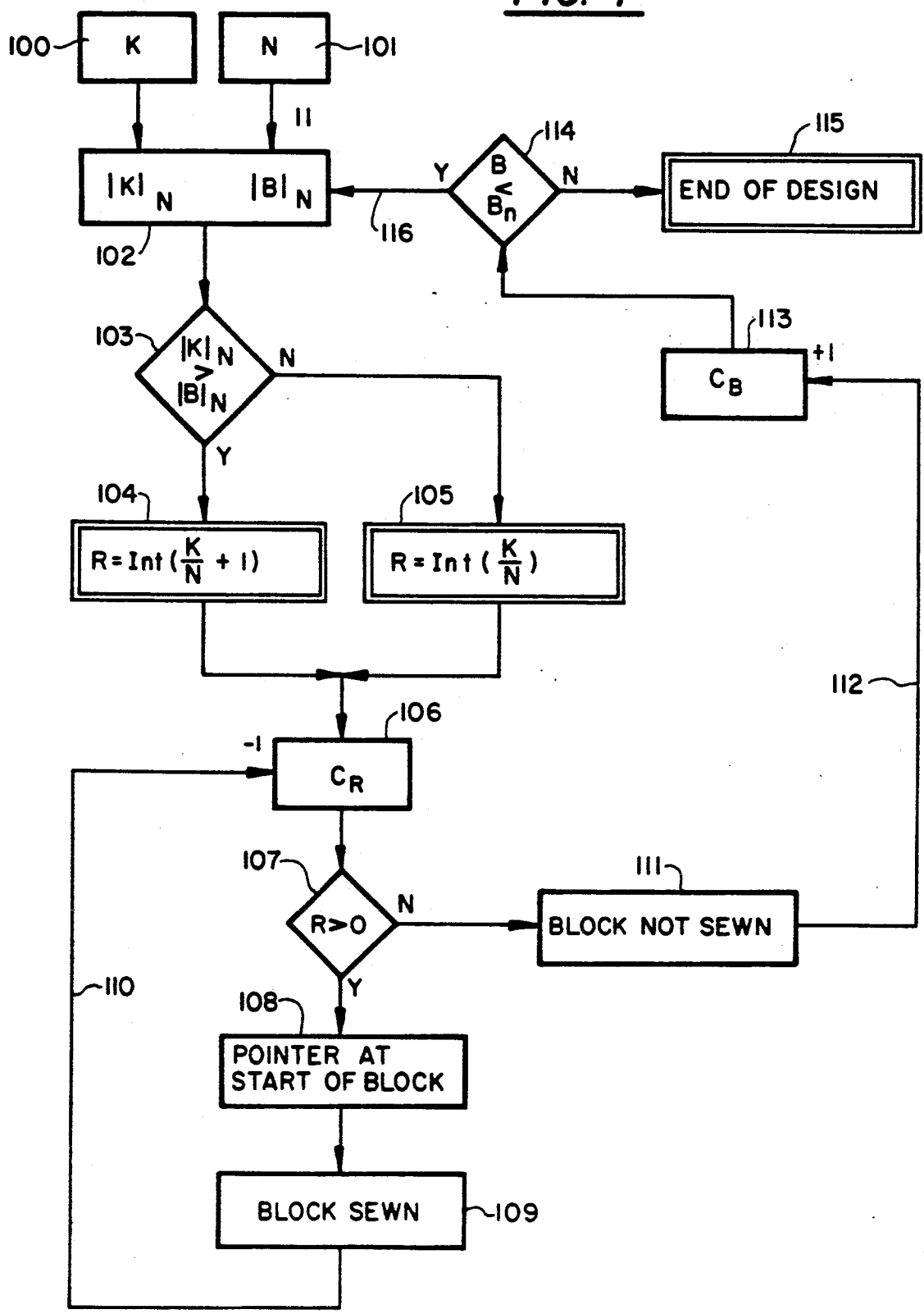
FIG. 7 is a sequential diagram illustrating the "elongation" function capable of being utilized by this machine.

These instructions are represented schematically in FIG. 7.

The magnitude of the desired elongation and the type of such elongation (positive or negative) is set by the user by actuation of key 12 (negative elongation) or key 13 (positive elongation). The number of successive depressions exercised on the one or the other of these keys will set this magnitude.

As the increment of elongation possible by actuation of these keys 12 and 13 is a constant, set in the factory, for example 25%, the microprocessor is able to determine the value of the coefficient K after each actuation (step 100 in FIG. 7). The value of the factor N also being known, (step 101). the microprocessor is able to calculate (step 102). for each block of stitches of the basic design chosen and progressively with displacement of the pointer p₀ from the entry (block B₀) towards the exit (block $B_{n-1}$) of the section of program relating to this design, a) the value of K in a system to the base N, i.e. $|K|_N$ b) the value of the quantification of each block $B_o$ to $B_{n-1}$ in the same system to the base N, i.e. $|B|_4$.

Thus, each time that $|K|_N$ is greater than $|B|_N$ (step 103), the microprocessor will determine the number of times R that the block under consideration, belonging to the original basic design, is to be found in the elongated design by applying the algorithm $R = \text{integer } (K/N+1)$ [step 104].

It will make use of the second algorithm $R = \text{integer } (K/N)$ [step 105]

in the opposite case.

The value of R thus obtained is stored in the aforementioned counter $C_R$ (step 106) (FIG. 6).

If this value of R is different from 0, for example, equal to r(step 107). the microprocessor MP will place its pointer at the beginning of the section $P_2$ of the memory (step 108).

It will then read, in memory P, instructions contained in the section $P_2$ and direct sewing of the corresponding block of stitches (step 109).

It then orders a reduction of one unit in the value of R stored in the counter $C_R$ (step 110).

If the new value of R is still other than 0, the microprocessor will once again proceed according to the steps 107 to 110 above, and so on as long as R remains greater than 0.

It follows that any block B of the basic design will be successively sewn r times in the elongated design.

When R becomes equal to 0, the machine will no longer sew (step 111). and the microprocessor will increment by one unit (step 112) the aforementioned block counter $C_B$ (step 113). Such a counter is, in effect, adapted to count the number of blocks of the basic design selected met by the counter in scanning the memory section relating to that design, during the sewing of the elongated design, whether or not an original block has been repeated one or several times in the design.

By convention, the first block will be characterised, in the counter $C_B$, by the number B=0, and the last block, of a design of n blocks, by the number B=n−1.

By virtue of this counter $C_B$, the microprocessor will know, at each instant, in which part of the basic design it is operating.

If, at a given instant, the value memorised in the counter $C_B$ becomes equal to n, (step 114), the microprocessor knows that it has reached the end of the section of memory for the basic design and that accordingly, sewing of the elongated design is finished (step 115).

As a variant, it would be possible to obtain this same result without knowing, "a priori", the above value n, and to provide accordingly that the sewing instructions for each design comprise, at the end of these instructions, a "flag" indicating to the microprocessor that the design in question is finished.

In either case, the microprocessor will then return the pointer $p_o$ to the entry (block 0) of the section $P_2$ of the program for the basic design for a further implementation of the corresponding elongated design, this of course only if the user again acts on the actuator A.

If the value memorised in the counter $C_B$ is less than n, for example equal to m, the microprocessor knows that it should recommence its logic operations and calculations, corresponding to the program steps 102 to 114, with the new value m of the block which it will have to change to the base N (step 116) to compare it with $|K|_N$, and so forth as long as the value of the counter $C_B$ remains less than n−1 (the number characterizing the last block of a design having n blocks being equal to n−1 if the first block is characterized by the number 0).

The elongated design obtained will effectively correspond to that of FIGS. 4A and 5A in the case of elongations of 75% and 125%. It may be seen that elongated designs effectively retain a general shape resembling that of the basic design from which they are derived (FIG. 3A).

It may in particular be remarked that by comparing the outlines of the basic and elongated designs shown in FIGS. 3, 4 and 5, irregularities of shape appearing in the elongated designs are of very slight magnitude; it should also be noted that such irregularities will not, in practice, be any more noticeable than those formed naturally during the actual sewing, which depend, as is known, on the structure of the material to be sewn (thickness, nature of the material etc.).

It should also be noted that the program described, by virtue of which the sewing machine according to the invention may implement and carry out the "elongation" function in the manner hereinbefore explained, also allows suppression of the selection of this function, in particular as long as it has not commenced. It suffices, for this, to exert a further depression on the two keys 12 and 13 within the time delay of 2 seconds mentioned.

Even though in the preceding description and in the drawings to which it refers, there has only been envisioned the case where the two keys enabling implementation of the elongation function may be the same as those which may be used to obtain a simple elongation or shortening of a basic design, it is obvious that according to a variant of embodiment of the sewing machine according to the invention, it would be possible to provide two distinct pairs of keys serving, respectively and exclusively, the one for control of the lengthening/shortening function for any preselected basic design, the other for control of the "elongation" function.

We claim:

1. A computerized sewing machine, comprising:

first means for controlling alternating axial movement of a needle to penetrate into material to be sewn, and a loop pick-up for cooperating with the needle to form a sewing stitch, second means for controlling relative displacements of the needle and the material to be sewn in two orthogonal directions with a specific amplitude in each direction, at least one electronic memory for storing sewing instructions corresponding to various patterns to be sewn, said instructions being readable sequentially and selectively to effect control of said second means, first selection units for said patterns, a microprocessor for co-operating with said memory to read from it sewing instructions for any selected pattern and to control the second control means in accordance with read instructions, p1 third means for controlling the operation of the microprocessor, based on instructions stored in the memory, to control execution of patterns of a length different from that corresponding to said instructions, and second units for selection of the variation in length to be implemented for any preselected pattern, wherein said third means embodies, stored in the memory, a first sequence of computerized instructions for sewing at least certain blocks of stitches defining the selected pattern as stored so as to obtain a corresponding repetition of the sewing of these blocks to form the pattern of modified length as a function of the variation selected by actuation of said second units, and at least a second sequence of computerized instructions setting the number of times that each block belonging to the stored pattern should be sewn, in the modified pattern, as well as the positioning of the blocks within the modified pattern, the procedure being effected so that the elongated pattern sewn on the material has the modified length required while retaining a general shape resembling that of the pattern stored in the memory and from which it is derived.

2. A machine according to claim 1 wherein said second sequence of computerized instructions embodies algorithms, giving the number R of implementations, in the elongated pattern, of each block of stitches of the basic pattern as a function of the position of the block within this basic pattern as well as of the length desired for the elongated design.

3. A machine according to claim 2 wherein said third means additionally embodies a first counter for the blocks of the basic pattern, a second counter adapted to record, for each block of the basic pattern, the number of times R that it should be implemented, an element for bringing the microprocessor to the part of the program corresponding to the beginning of the sewing instructions for the block which is to be read as long as the number R indicated by the second counter is greater than 0, an element for directing the microprocessor to read the sewing instructions for this block of stitches, an element for decrementing the second counter by one unit as a result of this reading, and an element for incrementing by one unit the block counter while the value memorized in the second counter is nil, this counter thus memorizing, at each instant, the position of the block of the basic pattern for which it was necessary to calculate the number of implementations R within the elongated pattern.

4. A method for controlling a sewing machine having an axially movable needle, a device for driving the needle in an alternating axial movement, a mechanism for controlling a relative displacement, in translation, of the needle and of a material to be sewn, a loop pick-up, first means for driving said loop pick-up an second means for controlling, in synchrony, said device for driving, said mechanism for controlling, and said first means for driving so as to sew designs or patterns onto the material, each said design or pattern, comprising a plurality of blocks of stitches, at least a portion of an outline of each of said blocks of stitches embodying at least a series of two adjacent stitches resulting from a relative displacement of the cloth and the needle, of different amplitude or different orientation from stitch to stitch, the machine further including a control unit whereby an original length of a basic pattern can be respectively increased and decreased while keeping the density of the stitches sewn constant wherein, in order to increase the original length of a basic pattern, the method comprising repeating at least once the sewing of at least certain blocks of stitches of the basic pattern, immediately after the block to be repeated and wherein, to reduce the length of said basic pattern, the method comprises suppressing the sewing of at least certain of the blocks of the basic pattern, a total number of blocks of the pattern thus modified being equal to the number of blocks of the basic pattern multiplied by the ratio of the length desired for the modified pattern to the length of the basic pattern.

5. A method according to claim 4, in which each increase or decrease respectively in the basic length of the pattern chosen is a multiple of a unit increment of predetermined value, wherein each block of stitches of the basic pattern is repeated a number of times $R-1$, where $$R = \text{integer } (K/N + 1) \quad [1] \quad \text{if } |B|_N < |K|_N$$
$$R = \text{integer } (K/N) \quad [2] \quad \text{if } |B|_N \geq |K|_N$$

equations in which

N is an integer $>1$, of value corresponding to the inverse of the unit I;

$B = 0, 1, 2 \ldots N-1$ is a number characteristic of the position occupied by each block of stitches of a basic pattern of "n" blocks, between the beginning (position o) and the end (position $n-1$) of this pattern;

$|B|_N$ is the absolute value of B calculated in a numeric system of base N;

K is the ratio between the total length of the pattern and the value of the unit increment; and $|K|_N$ is the absolute value of K calculated in a numeric system of base N.

* * * * *